Nov. 18, 1969    M. GITTLEMAN    3,479,066
PIPE COUPLING

Filed July 3, 1967    4 Sheets-Sheet 1

INVENTOR.
MORRIS GITTLEMAN
BY Herzig Walsh & Blackman
ATTORNEYS

Nov. 18, 1969  M. GITTLEMAN  3,479,066
PIPE COUPLING

Filed July 3, 1967  4 Sheets-Sheet 2

INVENTOR.
MORRIS GITTLEMAN
BY
Herzig, Walsh & Blackham
ATTORNEYS

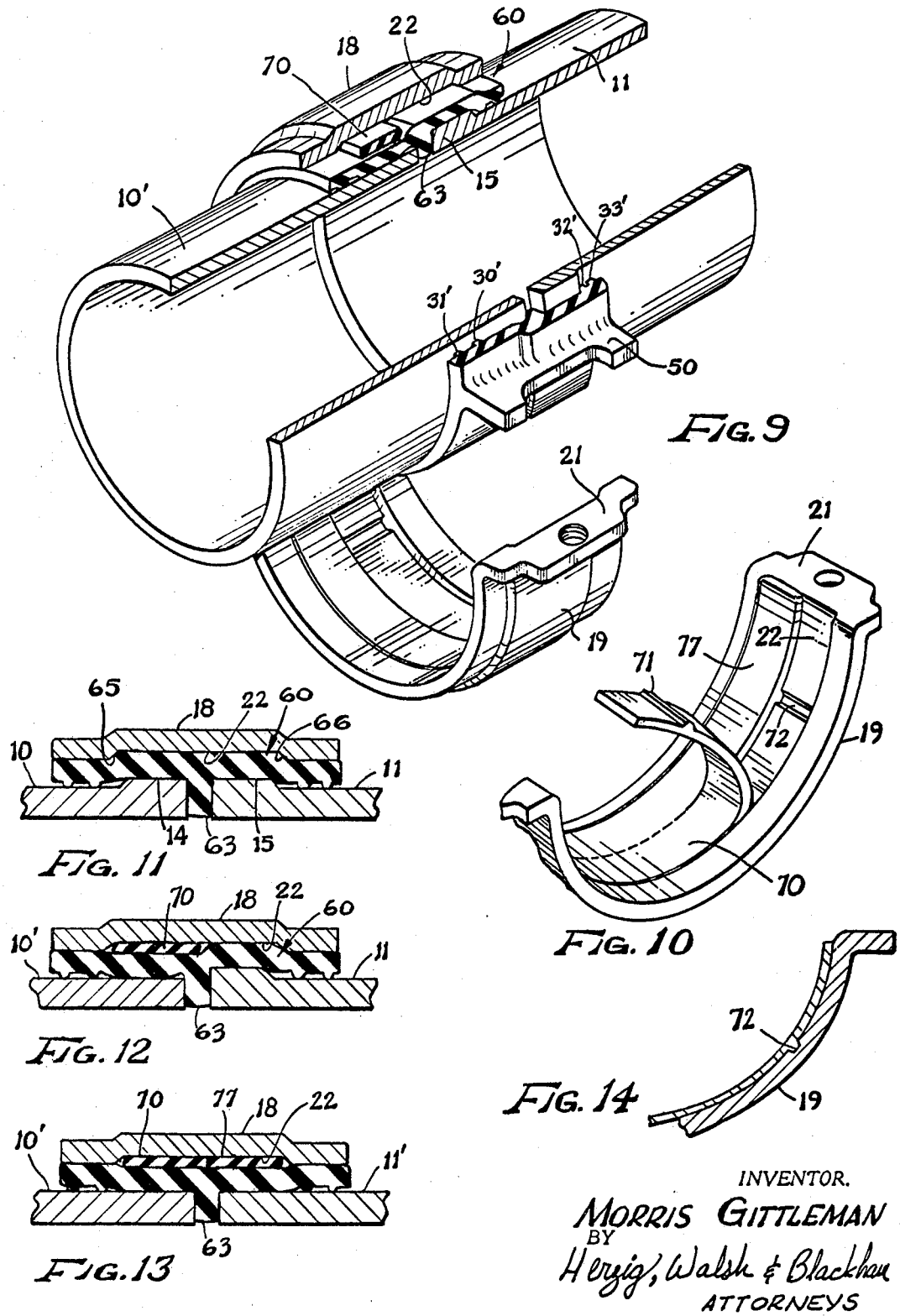

Nov. 18, 1969  M. GITTLEMAN  3,479,066
PIPE COUPLING
Filed July 3, 1967  4 Sheets-Sheet 4
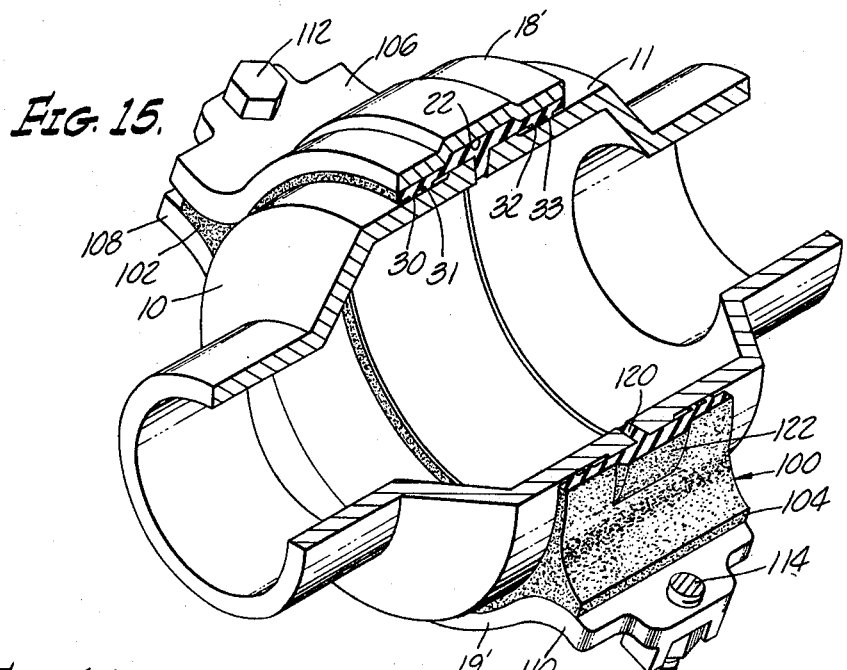
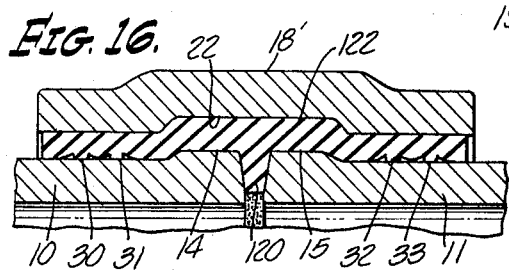
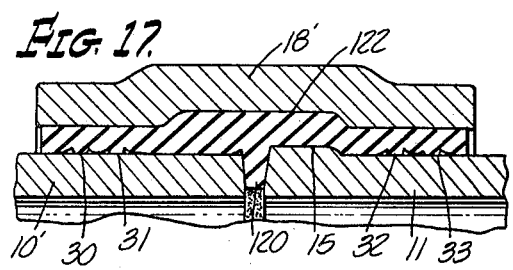
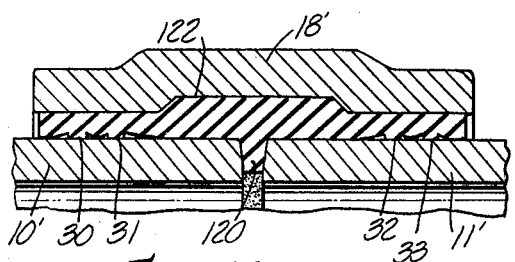
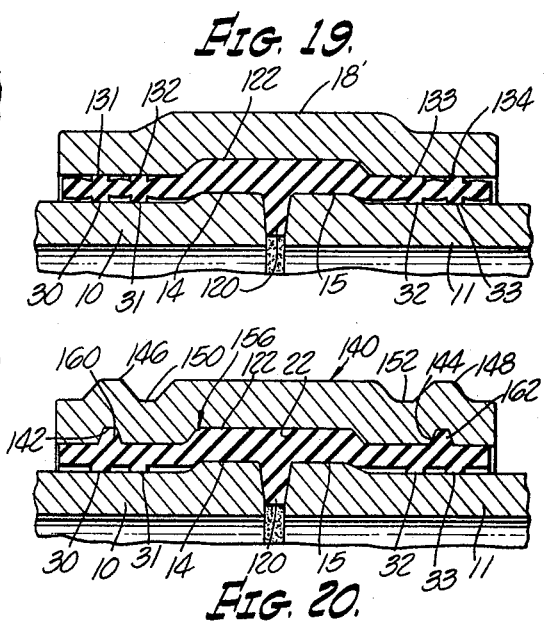
INVENTOR
MORRIS GITTLEMAN
BY
Herzig, Walsh & Blackham
ATTORNEYS

United States Patent Office 3,479,066
Patented Nov. 18, 1969

3,479,066
PIPE COUPLING
Morris Gittleman, 8232 Blackburn Ave.,
Los Angeles, Calif. 90048
Continuation-in-part of application Ser. No. 602,744,
Dec. 19, 1966. This application July 3, 1967, Ser.
No. 650,705
Int. Cl. F16l 21/00, 21/02, 19/00
U.S. Cl. 285—236                                   13 Claims

ABSTRACT OF THE DISCLOSURE

A pipe coupling particularly adapted for coupling together the ends of pipes that may or may not have annular end ribs, i.e. spigots. The coupling embodies a gasket into which the ends of the pipes are fitted and rigid clamping members clamp around the gasket. The gasket has diametrically opposed extending ears which are clamped between mating lugs on the clamping members. The gasket is made with an integral external annular rib or separate bands which fit into a shallow internal annular recess in the clamping members to compensate for the absence of end ribs on the pipes.

---

This application is a continuation-in-part of application Serial No. 602,744 filed Dec. 19, 1966 and now abandoned.

Summary of the invention

This invention relates to an improved coupling means adapted to couple the ends of pipes together in fluid tight relationship. The coupling of the invention is adapted for coupling together the ends of pipes that either have or do not have external annular end ribs, known as spigots. The coupling of the invention is a versatile one capable of providing a firm, rigid, and positive coupling between either of these types of pipe ends or furthermore, it can provide a similar sealing coupling between the end of a pipe having a spigot and the end of another pipe not having a spigot. The coupling is adapted for use with pipes of uniform diameter throughout or with pipe sections having enlarged or belled end parts. The invention is particularly adapted to, but not limited to use with soil pipes. In preferred forms of the invention the coupling embodies clamping members which clamp around the ends of the pipes to be joined. A circular gasket is provided which surrounds the ends of the pipes being joined within the clamping means. The clamping means is formed of generally semi-circular flanged members having a shallow internal annular groove into which the gasket can deform. The gasket has diametrically opposed extending ears which are clamped between lugs on the clamping members to compensate for dimensional variations in the clamping members and/or the pipe ends. The gasket has internal annular ribs including a central rib which fits between abutting ends of the pipe sections being joined, and outwardly spaced annular ribs which are forced against the pipe surfaces. The gasket may also have external annular ribs including a central rib and outwardly spaced annular ribs providing recesses adapted to receive sealing bands in certain forms of the invention, as will be described. In a preferred form of the invention the gasket is provided with an integral, external, relatively wide rib instead of the sealing bands as will be described in detail hereinafter.

With the construction as described, when the pipe ends being joined have end annular ribs or spigots, these ribs can deform the gasket outwardly into the annular space in the clamping members and a positive seal can be realized. An effective seal can be realized with the same coupling members when the pipes being coupled do not have annular end ribs. In this situation, the gasket is provided with the integral external rib or flat circular sealing bands are provided which may be used either on the inside or the outside of the gasket. They may be used on the outside of the gasket in recesses provided by external annular ribs. These sealing bands occupy space in the annular recessess in the clamping members and cause the intermediate part of the gasket to be urged firmly against the outer end surfaces of the pipe, thus compensating for the absence of the annular end ribs. On the other hand, the sealing bands may be positioned inside of the gasket and in the annular recesses between the central internal annular rib and outwardly spaced internal annular ribs. In these circumstances the gasket is deformed outwardly into the annular recesses inside of the clamping members and again, the presence of the sealing bands compensates for the absence of the annular end ribs on the ends of the pipes being coupled. It is to be understood of course that a sealing rib is used only where the end rib on the pipe is not present. When the gasket with an integral external rib is used this rib extends circumferentially to the diametrically opposed ears. It serves the purpose of the bands referred to.

It is a primary object of the invention to provide a simplified and positive acting pipe coupling having the necessary versatility to serve the purposes set forth above. It is a further object of the invention to provide such a pipe coupling which provides a firm, rigid joint in circumstances wherein the pipe ends do not have end spigots; where they do have end spigots; or where one pipe end has a spigot and the other does not. Pipe couplings as known in the prior art have generally been deficient in several respects including lack of versatility in respect of being capable of providing a positive, effective joint in the different circumstances referred to relative to the presence or absence of spigots at the ends of the pipe sections. The prior known couplings of the type referred to have also been deficient in respect of being capable of providing a strong, firm, rigid joint. A further object of this invention resides in the overcoming of all of these deficiencies by way of providing a coupling which provides a firm, rigid and positive joint and seal in all of the circumstances set forth.

In the preferred form of the invention the gasket has diametrically opposed ears which are positioned between the flanges or lugs on the clamping members which are secured together. These ears are configurated to accommodate having the sealing bands pass over them when the sealing bands are used on the outside of the gasket, as will be described in detail hereinafter. A further object is to compensate for dimensional variations in clamping members or pipe ends by means of the said ears.

In a further form of the invention, the sealing bands are discontinuous, preferably extending 180° and being positioned in the recess in the clamping means. In this form of the invention, external annular ribs are not provided on the gasket.

In the light of the foregoing a further object of the invention is to provide a pipe coupling as described wherein one or more sealing bands are included in the coupling joint positioned externally of the gasket between external annular ribs on the gasket.

Another object of the invention is to provide a pipe coupling as described wherein the sealing bands are provided on the inside of the gasket in the space between the central internal annular rib and outwardly spaced annular ribs.

Another object is to provide a pipe coupling as described wherein one or more discontinuous sealing bands is provided, outside of the gasket in the recess in the sealing means.

Another object is to provide a coupling having a gasket which has a relatively broad, integral, external rib which serves the purposes of the separate sealing bands referred to in the foregoing.

Further objects and additional advantages of the invention will become apparent from the following detailed description and annexed drawings wherein:

FIGURE 9 is a perspective view of a modified form of the invention wherein the sealing bands are discontinuous;

FIGURE 10 is a perspective view of one of the clamping members of FIGURE 9;

FIGURE 11 is a sectional view showing the coupling of FIGURE 9 in use with pipe ends having annular ribs;

FIGURE 12 is a sectional view similar to that of FIGURE 11 showing a coupling in use where only one of the pipe ends has an annular rib;

FIGURE 13 is a sectional view similar to that of FIGURE 12 showing the coupling use where neither of the pipes has an end annular rib;

FIGURE 14 is a detail view of a coupling showing means for holding the discontinuous sealing band in position;

FIGURE 15 is a perspective view partly cut away of another form of the invention;

FIGURE 16 is a sectional view through a part of the coupling of FIGURE 15;

FIGURE 17 is a sectional view similar to that of FIGURE 16 wherein only one of the pipe ends has an annular rib or spigot;

FIGURE 18 is a sectional view similar to the views of FIGURES 16 and 17 wherein neither of the pipe ends has a spigot or annular end rib;

FIGURE 19 is a sectional view showing another modified form of the invention;

FIGURE 20 is a sectional view showing a further modified form of the invention.

Figure 1:
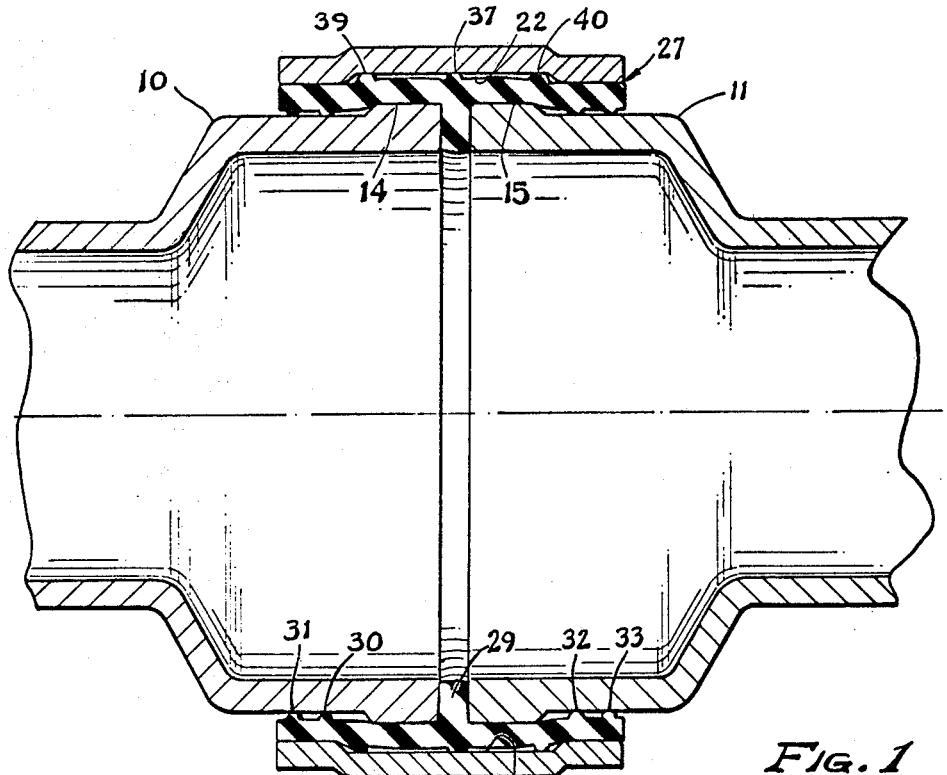
FIGURE 1 is a sectional view of one form of the invention used with pipes having end spigots.
Figure 4:
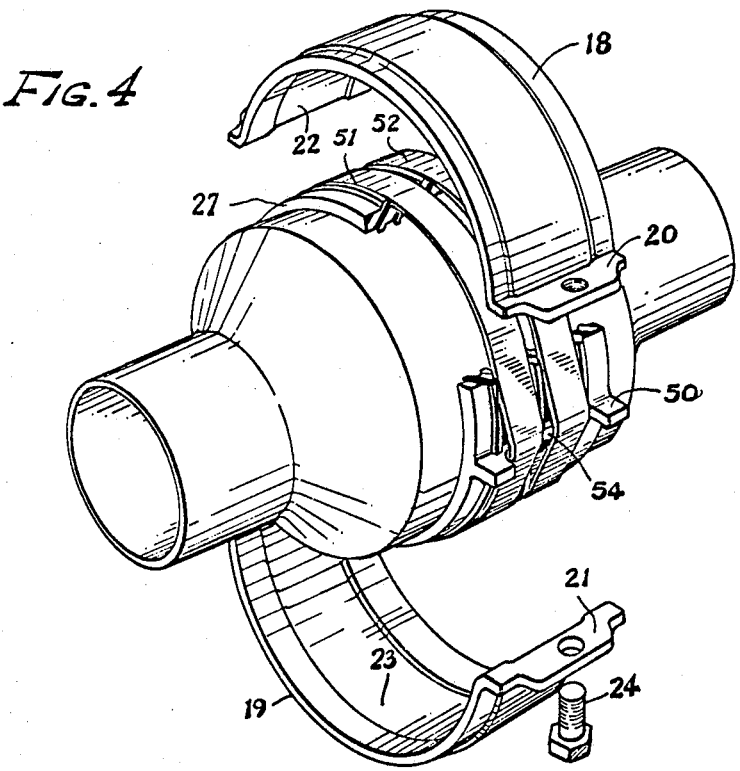
FIGURE 4 is a perspective view of the form of the invention shown in FIGURE 2; (no spigots on the pipe ends)

Referring now more particularly to FIGURE 1 of the drawings, one form of the pipe coupling of the invention is shown in this figure. Numerals 10 and 11 designate ends of pipe or conduit sections which in this instance, are enlarged or belled at the ends. These pipe sections are of the type that have spigots at the ends, (i.e.), annular end ribs as shown at 14 and 15. The nature of the pipe coupling of the invention is such that it is capable of providing a rigid, effective seal whether or not the external annular end ribs are present. The coupling comprises semi-circular clamping members 18 and 19 which have generally radial flanges 20 and 21 such as shown in FIGURE 4, adapted to be secured together by a screw 24 as shown. The flanges have threaded openings as shown and they are secured together as shown. The members 18 and 19 have similar flanges on the opposite side secured together.

Each of the clamping members 18 and 19 has a shallow internal annular recess as designated at 22 and 23. The clamping members have a slightly greater external diameter opposite the internal recesses.

Figure 8:
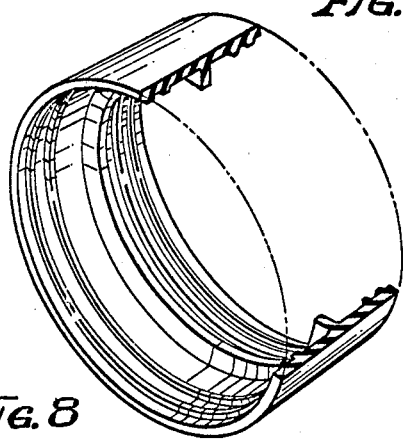
FIGURE 8 is a detail view of a prior art form of gasket.

Numeral 27 designates a circular gasket member which may be made of any suitable flexible sealing material, such as neoprene. The gasket is relatively thin in section. It has an integral internal intermediate annular rib 29. It also has internal annular ribs spaced outwardly from the central rib 29, as designated at 30 and 31 adjacent one end and at 32 and 33 adjacent the opposite end. The gasket has an intermediate circumferential external annular rib as designated at 37. It has external annular ribs as designated at 39 and 40 spaced from the intermediate rib 37 providing annular recesses between ribs. FIGURE 8 shows a prior art gasket. Gasket 27 is different from the prior art gasket in having the external annular ribs.

FIGURE 1 shows the pipe coupling in clamped and sealing position. It will be observed that the internal rib 29 on the gasket 27 fits in between the abutting ends of the pipe sections 10 and 11. The clamping members 18 and 19 are drawn together, and firmly clamped and deform the gasket 27 against the outer surfaces of the pipe ends 10 and 11. As will be observed, the presence of the spigots or external annular ribs 14 and 15 causes the intermediate part of the gasket 27 to be deformed into or toward the annular recesses 22 and 23 in the clamping members 18 and 19. The outer parts of the clamping members 18 and 19 deform the end parts of the gasket 27 against the outer surfaces of the pipe ends 10 and 11 causing some deformation of the ribs 30, 31, 32 and 33, so that a firm, effective seal is formed between the clamping means and the pipe ends over substantial axial length of the pipe ends. Furthermore, the joint formed by the coupling is extremely secure and rigid and is in fact, stronger than a section of pipe without a joint or coupling.

Figure 2:
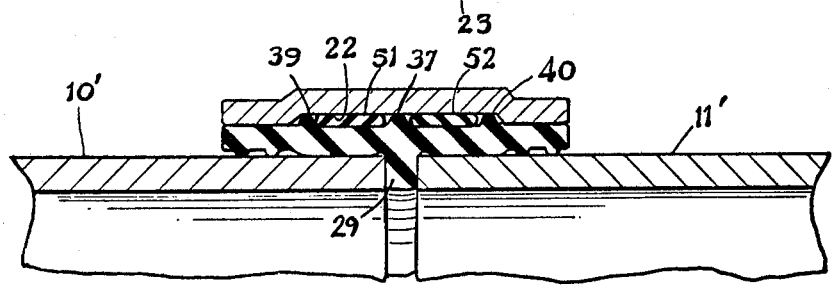
FIGURE 2 is a sectional view of another form of the invention wherein sealing bands are used with the gasket, on the outside thereof.
Figure 7:
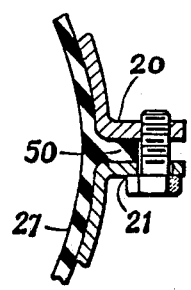
FIGURE 7 is a detail view showing the securement of clamping members of FIGURE 4.

FIGURE 2 shows a modified form of the invention in which parts corresponding to parts in FIGURE 1 are identified by the same reference numerals. The pipe sections in this figure are the same as in FIGURE 1 except that they are of uniform diameter and do not have spigots (i.e.), they do not have the external annular end ribs 14 and 15. They are identified by similar numerals primed. To accommodate to these circumstances, the form of sealing means in the coupling is modified. FIGURES 4 and 7 show one of the extending diametrical ears 50 which fit in between the flanges 20 and 21. In this form of the invention a pair of flat sealing bands 51 and 52 is provided. These bands may be made of any suitable flexible sealing material, such as neoprene. They are placed on the exterior of the gasket 27 in the recesses between the central external annular rib 37 and the outwardly spaced annular ribs 39 and 40. As will be observed, the extending ears are configurated so as to be recessed as shown at 54, to accommodate passage of the bands 51 and 52 over these ears in the position of the ears between the flanges 20 and 21 of clamping members 18 and 19.

FIGURE 4 illustrates the sealing effect of the gasket 27 and the sealing bands 51 and 52 within the joint. The end parts of the gasket 27 are deformed and firmly pressed against the external surfaces of the pipe ends 10 and 11 to form an effective seal. The sealing bands 51 and 52 are in the external recesses of the gasket 27 and fit in the internal annular recesses 22 and 23 in the clamping members 18 and 19. The effect is that the sealing bands 51 and 52 urge the intermediate portion of the gasket 27 inwardly to compensate for or occupy the space otherwise occupied by the annular end ribs or spigots 14 and 15. It can be observed therefore that the coupling can be applied either with or without the sealing bands 51 and 52 and that these sealing bands are employed when coupling between pipe ends not having end spigots.

Figure 3:
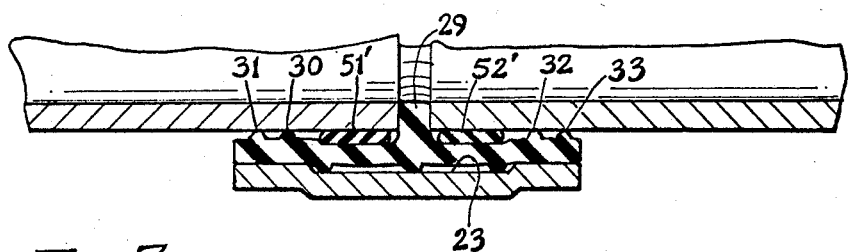
FIGURE 3 is a sectional view of a form of the invention similar to that shown in FIGURE 2, with sealing bands on the inside of the gasket.

FIGURE 3 shows another form of the invention which is similar to the embodiment of the invention as just described except the sealing bands 51 and 52 are used on the inside of the gasket 27. In this form of the invention the sealing bands 51' and 52' are in the recesses formed between the central internal annular rib 29 of gasket 27, and the outwardly spaced internal annular ribs 30 and 32. As in the previous form of the invention the outer parts of the clamping members 18 and 19 firmly clamp the axially outer parts of the gasket 27 against the external end surfaces of the pipes 10 and 11. The sealing bands 51 and 52 occupy space that would otherwise be occupied by the external annular end ribs or spigots 14 and 15. The intermediate portions of the gasket 27 are deformed outwardly into or toward the internal annular recesses 22 and 23 in clamping members 18 and 19. As may be observed, a positive effective seal is provided by the coupling when the ends of pipe sections are coupled not having spigots, that is external annular end ribs.

Figure 5:
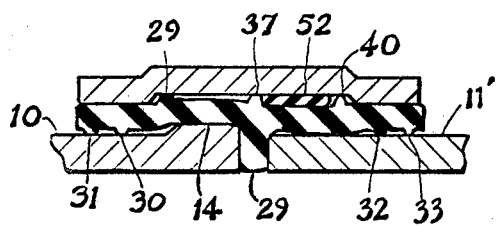
FIGURE 5 is a sectional view of a form of the invention shown joining pipe ends, one with and one without a spigot, and with one sealing band outside of the gasket.

FIGURE 5 shows the coupling of the invention adapted for coupling together pipe ends wherein one pipe end has an external annular rib and the other does not. Similar parts in FIGURE 5 are identified by similar reference numerals. It will be observed that in this adaption of the invention only one of the sealing bands 52 is used. This band is used only on that side of the coupling wherein the end of the pipe does not have an external annular rib or spigot; the sealing band is not used on the other side of the coupling. It will be observed that in making a joint such as this the coupling readily adapts itself to the circumstances. The coupling on one side seals in the manner as described in connection with FIGURE 1, whereas on the other side it seals in the manner as described in connection with FIGURE 2.

Figure 6:
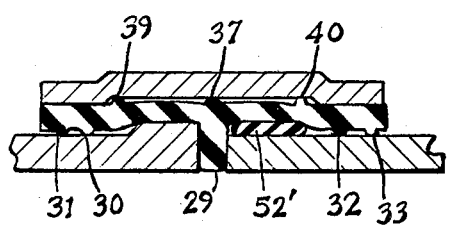
FIGURE 6 is a sectional view of a form of the invention similar to that of FIGURE 5 with a sealing band inside the gasket.

The sealing band 52 may be used either on the inside or the outside of the gasket 27 in the manner previously described. FIGURE 6 shows a joint like that of FIGURE 5 with sealing band 52' on the inside of the gasket 27. In this joint, the gasket 27 deforms partly as described in connection with FIGURE 3. The seal is strong, positive and effective, the parts accommodating themselves to the difference in the parts being coupled. It will be observed that externally the coupling is the same, having the same strength and rigidity as in the other embodiments of the invention. This is a result that, of course, cannot be realized in types of couplings wherein a flexible clamping member is used around the gasket since in those circumstances (i.e.) joining pipe ends where one pipe has a spigot and the other does not; an undesirable bulging or humping of the clamping means would occur with unbalanced clamping effect and uncertain sealing. Furthermore, in that type of coupling the joint is relatively weak and wobbly.

FIGURE 9 shows a further modified form of the invention wherein the sealing bands are not continuous and wherein the discontinuous bands are used only on the outside of the gasket. The pipe ends of FIGURE 9 are designated at 10' and 11. The clamping members 18 and 19 are like those of the previous embodiments. The gasket is designated at 60. It has an internal annular rib 63 that fits in between the ends of pipes 10' and 11.

FIGURE 9 shows the relationship of the parts of the coupling when only one of the pipes has an annular end rib as designated at 15. In these circumstances, the discontinuous sealing band, made of any suitable material, is used as designated at 70. This band is discontinuous and may extend for substantially 180°. It fits into the recess 22 as shown in FIGURE 10 and preferably it has a transverse rib 71 adapted to seat in a transverse groove 72 in the bottom of the recess 22 to hold the discontinuous band 70 in position. See FIGURE 10. As may be seen, this band, in a position between the gasket 60 and inside of the coupling member 18 depresses the gasket into sealing contact with the external end surface of the pipe 10' and compensates for the absence of an annular end rib on this pipe, that is, it occupies space not filled by such an annular end rib. One of the advantages of discontinuous bands is that they do not have to pass over the ears 50 on the gasket 60.

FIGURE 11 shows a coupling between pipe ends, both of which have end ribs without the use of sealing bands. In this figure the gasket 60 deforms into the recess 22, the gasket bearing against the bevels 65 and 66 at the sides of the recess 22.

FIGURE 12 shows the coupling arrangement of FIGURE 9 in cross section. As may be seen, the part of the gasket 60 with the band 70 in position deforms as shown, into sealing engagement with the end of pipe 10'. The other half of the gasket 60 seals in the same manner as shown in FIGURE 11.

FIGURE 13 shows in cross section, the arrangement of the coupling for coupling together pipes neither of which has an annular end rib. In these circumstances, a second discontinuous sealing band 77 is used which is similar to the band 70. It produces a relationship of parts on the right side of the gasket similar to the relationship of parts adjacent to the band 70 and as described in connection with FIGURE 12. The band 77 is shown in position in FIGURE 10. FIGURE 14 shows a detailed part of the coupling member 19 showing the position of the transverse holding groove 72.

The discontinuous bands might also be used on the inside of the gasket, but in these circumstances it is preferable to use continuous bands since, of course, then it is not necessary for them to pass over the ears 50 on the gasket.

From the foregoing those skilled in the art will understand the nature and usage of the invention and will observe the manner in which it achieves and realizes the objects and advantages as set forth in the foregoing, as well as the many additional advantages that are apparent from the detailed description. The coupling provides a very firm and rigid joint which is at least as strong as the pipe without a coupling in it. The coupling adapts itself to the usage with pipes of uniform diameter or pipes that may be billed out at the ends as shown in FIGURE 1. It adapts itself to coupling together ends that either have or do not have annular end ribs or situations in which one pipe end has an annular end rib and the other does not. As shown in the foregoing, the invention may be practiced in various detailed manners, each of which embodies the principal of the invention.

FIGURE 15 shows another form of the invention which is the preferred form of the invention. Parts that are like corresponding parts in previous embodiments are identified by similar reference characters. The gasket in this form of the invention is designated at 100. The gasket has diametrically opposed ears 102 and 104. The clamping members 18' and 19' are similar to those of the previous embodiments. The clamping member 18' has an extending lug as shown at 106 and the clamping member 19' has extending lugs as shown at 108 and 110. Mating lugs are secured together clamping the gasket ears 102 and 104 between them as shown the mating lugs being securable together by bolts as shown at 112 and and 114. The extended ears 102 and 104 have concavely curved exterior contours as shown. The lugs on the clamping members 18' and 19' are similarly contoured so as to be complementary to the exterior contour of the ears 102 and 104. Thus, when the clamping members are drawn together, the ears can be compressed and in this manner compensation or accommodation is provided for dimensional variations in the pipe ends or in the clamps.

The gasket 100 has an intermediate internal annular rib 120 which fits between the pipe ends as shown. The gasket 100 is different from the gasket of the previous embodiments in that it has a relatively wide integral external annular rib 122 which extends around both sides of the gasket to the vicinity of the extending diametrical ears 102 and 104. This external rib serves the purposes of the separate bands of the previous embodiments.

FIGURE 16 is a cross-sectional view through a part of the coupling of FIGURE 15. This shows this form of the invention used with pipe ends both of which have spigots that is, end ribs as shown at 14 and 15. The external rib 122 fits into the recess 22 in the clamping members as shown and this part of the gasket is compressed in the space between the clamping member and the pipe end as shown. Sealing is effected by the internal annular ribs in as in previous embodiments. The position of the annular rib 122 in the recess in the clamping member positions the gasket and prevents the pipe ends from pulling out of the coupling.

FIGURE 17 shows the form of the invention of FIGURES 15 and 16 utilized for coupling pipe ends as shown at 10' and 11 where only one has an end rib or spigot. The rib 122 fits into the annular recess 22 as before. The part of the gasket opposite the spigot 15 is compressed as shown. The rib 122 serves to occupy the space between the clamping member 18' and the end of the pipe 10' on the other side of the internal rib 120.

FIGURE 18 is a sectional view showing the embodiment of the invention of FIGURE 15 adapted in a coupling where neither of the pipe ends 10' or 11' has an end rib or spigot. As will be seen, the rib 122 occupies the annular recess 22 in the clamping member so that space that would otherwise be occupied by spigots or end ribs is occupied by the gasket. Sealing is provided as in the other embodiments by the internal annular ribs in the gasket.

FIGURE 19 shows another form of the invention wherein the gasket is slightly different. The gasket in this form of the invention is designated at 130. The gasket has the integral annular rib 22 and in addition to the internal annular ribs 30, 31, 32 and 33, it has external annular ribs opposite the internal annular ribs as designated at 131, 132, 133 and 134. This gasket may be utilized as described in connection with previous embodiments where pipe ends are to be coupled where both pipe ends have end spigots or only one pipe end has a spigot, or neither has one. The external annular ribs serve to increase and enhance the sealing effect of the coupling when the clamping members are drawn together as described.

FIGURE 20 shows a modified form of coupling suited to similar adaptations and uses. One of the clamping members is shown at 140 in FIGURE 20. It is slightly different in cross-section from the clamping members of previous embodiments. The internal annular recess 22 is the same. However, this clamping member has internal annular grooves 142 and 144 adjacent its ends. On the outside opposite these grooves are annular ribs 146 and 148 adjacent to external annular grooves 150 and 152.

The gasket in this form of the invention is designated at 156. It is similar to the gasket of FIGURES 15 and 19 in that it has the integral external annular rib 122. It has the internal annular ribs similar to previous embodiments. However, at each end it has a single external annular rib such as shown at 160 at the left end and at 162 at the right end. These external annular ribs engage in the internal annular grooves 142 and 144 in the coupling member 140. Thus, assured sealing is provided for by way of the gasket having both internal and external annular ribs which are compressed into sealing engagement between the parts when the clamping members are drawn together.

From the foregoing, those skilled in the art will observe that the invention as described herein achieves and realizes all of the objects and advantages as set forth in the foregoing. An effective seal and joint is provided by the coupling which is strong and rigid, being stronger than a pipe section without a coupling. The coupling is extremely versatile in its ability to fully adapt itself to the coupling of pipe ends with or without spigots, or coupling a pipe end with a spigot to a pipe end without a spigot.

I claim:
1. A pipe coupling for coupling the ends of pipes or conduits in fluid tight relationship and adapted for pipes either with or without external annular end ribs comprising in combination, clamping means configurated for clamping around the pipe ends, said clamping means being rigid and generally circular and having a shallow internal annular recess, circular axially and circumferentially continuous gasket means interposed between the clamping means and pipe ends being coupled and spanning the ends of the pipes, said gasket means having an axial length substantially equal to the axial length of said clamping means, said gasket means including external projecting means increasing the effective radial thickness of the gasket means within a part at least of the axial portion of the clamping means having the said annular recess therein sufficiently to cause said external projecting means portion to normally bear against the bottom of said annular recess wherein said clamping means applies pressure to said gasket means throughout substantially the entire outer surface thereof.

2. A pipe coupling as in claim 1 wherein said gasket means has diametrically opposed outwardly extending axially elongated ears, the said clamping means having clamping lugs with said ears clamped therebetween.

3. A pipe coupling as in claim 1 wherein said gasket has an internal intermediate annular rib which fits between the ends of the pipes being coupled.

4. A pipe coupling as in claim 1 wherein the gasket means has internal annular end ribs adjacent the ends of the gasket means axially spaced from said recess whereby upon securing of the clamping means the ends of the gasket deform into sealing engagement with the pipe ends.

5. A pipe coupling joining the ends of pipes or conduits in fluid tight relationship comprising in combination, clamping means extending around the pipe ends, said clamping means being rigid, complementary, generally semicircular members having radial lugs at their ends, axially and circumferentially continuous circular gasket means interposed between the clamping means and the pipe ends being coupled and spanning the ends of the pipes, said gasket means having diametrically opposed outwardly extending axially elongated integral ears the said ears being clamped between said lugs, means urging adjacent lugs toward each other whereby said ears are compressed between the lugs, said ears being concavely curved and thickened at their inner edges and said lugs having complementary curved portions whereby compression of said ears exerts a radially inward force on said gasket means to accommodate for dimensional variations in the pipe ends and clamping means, the outer edges of said ears being clamped between said lugs radially outwardly of said complementary curved portions whereby said lugs are held spaced apart by said ears.

6. A pipe coupling as in claim 5 wherein the clamping means have a shallow internal annular recess, the gasket means including means increasing the radial thickness of the gasket means within at least a part of the annular recess.

7. A pipe coupling as in claim 6 wherein said means increasing the effective radial thickness of the gasket means comprises an integral outwardly extending annular rib on the gasket means adapted to fit into the said annular recess in the clamping means.

8. A pipe coupling as in claim 7 wherein the gasket means has internal annular end ribs adjacent the ends of the gasket means whereby upon securing of the clamping means the ends of the gasket deform into sealing engagement with the pipe ends.

9. A pipe coupling as in claim 8 wherein the gasket means has external annular end ribs opposite the internal annular end ribs.

10. A gasket as in claim 9 wherein the clamping means has internal annular grooves configured to receive the external annular ribs on the gasket means.

11. A pipe coupling for coupling the ends of pipes, comprising: generally cylindrical, rigid clamping means having an internal circumferential recess therein between the ends thereof; a generally cylindrical gasket having inner and outer substantially cylindrical surfaces and having an outer diameter substantially equal to the inner diameter of the ends of said clamping means; and at least one circumferentially extending separate sealing band engaging said outer cylindrical surface, seated in said recess and radially outwardly of one pipe end, the radial dimension of said sealing band being at least equal to the depth of said recess whereby both the ends of said clamping means and the bottom of said recess exert clamping pressure on said gasket and the bottom of said recess exerts clamping pressure on said band and said gasket; said clamping members having radial flanges adapted to be clamped together, said gasket having diametrically opposed outwardly extending ears positioned between said flanges.

12. A pipe coupling as defined in claim 11 wherein said sealing band is a continuous circular band passing over said ears.

13. A pipe coupling as defined in claim 11 wherein said sealing band comprises a pair of substantially semi-circular sections respectively seated in the recesses of said clamping members and having ends terminating adjacent said ears.

References Cited

UNITED STATES PATENTS

| | | | |
|---|---|---|---|
| 881,022 | 3/1908 | Nailler | 285—373 X |
| 1,976,797 | 10/1934 | Naylor | 285—373 |
| 2,041,132 | 5/1936 | Johnson | 285—373 X |
| 2,165,920 | 7/1939 | Burnip | 285—373 X |
| 3,199,899 | 8/1965 | Fujii | 285—373 X |
| 3,233,922 | 2/1966 | Evans | 285—236 |
| 3,329,446 | 7/1967 | Katis et al. | 285—373 X |
| 3,341,232 | 9/1967 | Deakins | 285—373 |
| 3,376,055 | 4/1968 | Donroe | 285—236 |
| 2,417,741 | 3/1947 | Dillon | 285—373 |
| 3,006,663 | 10/1961 | Bowne | 285—373 X |
| 3,153,550 | 10/1964 | Hollett | 285—373 X |

FOREIGN PATENTS 794,580   5/1958   Great Britain.

THOMAS F. CALLAGHAN, Primary Examiner

U.S. Cl. X.R.

285—373